INVENTORS
BERNARD BLUM
JOHN W. SCHWARTZENBERG

William G. Miller Jr.

AGENT

3,566,671
Patented Mar. 2, 1971

3,566,671
PROCESS MEASUREMENTS IN OXYGEN BLOWN STEEL REFINING FURNACES DURING THE FINISH BLOW PHASE
Bernard Blum, Philadelphia, and John W. Schwartzenberg, Maple Glen, Pa., assignors to Leeds and Northrup Company, Philadelphia, Pa.
Filed June 2, 1967, Ser. No. 643,226
The portion of the term of the patent subsequent to Oct. 28, 1986, has been disclaimed
Int. Cl. G01n 33/20
U.S. Cl. 73—23                    14 Claims

ABSTRACT OF THE DISCLOSURE

During the finish blow phase of a B.O.F. heat the dissolved oxygen, the carbon concentration and the manganese concentration of the bath are determined by carrying out a continuous oxygen balance from a starting point when the carbon concentration is sufficiently high to be determined with adequate accuracy by other means (for example, .20%). The oxygen balance is carried out by subtracting from a signal representative of the total oxygen flow to the furnace, a signal representing the oxygen lost in carbonatious gases and modifying the resulting signal which is representative of the total FeO in the slag and in the bath in accordance with a factor indicative of the relative distribution of FeO in the bath and the slag to thereby obtain a measurement of the FeO and hence the dissolved oxygen in the bath alone.

The carbon concentration in the bath is determined from the known relationship between the dissolved oxygen in the bath and the carbon concentration at low carbon values. The manganese concentration is also determined in accordance with the fixed relationship it has with the dissolved oxygen and the carbon concentration in the bath.

CROSS REFERENCE UNDER RELATED APPLICATIONS

The following applications disclose and claim some of the subject matter disclosed but not claimed herein. U.S. applications: Ser. No. 444,014, filed Mar. 30, 1965, now Pat. 3,441,725; Ser. No. 443,941, filed Mar. 30, 1965, now Pat. 3,475,599; Ser. No. 534,617, filed Feb. 14, 1966.

BACKGROUND OF THE INVENTION

This invention relates to a method and means for continuously determining the concentration of constituents in the bath of an oxygen blown steel refining furnace. More particularly, the invention relates to a method and means for continuously determining the dissolved oxygen, the carbon concentration and the manganese concentration in the furnace bath during the finish blow phase of the refining process when carbon concentrations of a low value are desired.

In most steel refining processes it is necessary to determine the concentration of the various constituents of the bath by laboratory analysis or other direct procedures. In the operation of an oxygen blown steel refining process other means must be found because of the adverse conditions preventing direct access to the bath itself and also because of the rapidity by which the process proceeds. Recently, carbon determinations in oxygen blown processes have been made by indirect means. For example, when carbon concentrations are in the higher ranges, such as above .25%, accurate measurements may be made by integrating the carbon loss rate as determined by multiplying the mass flow of the exhaust gases from the process by the concentration of the carbonaceous gases in the exhaust system. When the carbon concentrations in the bath get below .25%, however, indirect indications of the carbon concentration may be obtained by calculating the carbon removal efficiency, the carbon loss rate divided by the oxygen flow, as an indication of the carbon concentration. The method and means of this invention are also useful for carbon concentrations below .25% and become most useful as carbon concentration goes below .05%.

SUMMARY OF THE INVENTION

In accordance with the present invention there is provided a method and means for determining the dissolved oxygen, the carbon concentration and the manganese concentration in the bath of an oxygen blown steel refining furnace. This is accomplished by means which generate a first signal representative of the measured flow rate of oxygen supplied to the furnace along with means for generating a second signal representative of the rate of oxygen loss due to combination with carbon in the bath. There is then provided a means for generating a third signal representative of the dissolved oxygen in the bath. This third signal is obtained by integrating the difference between the first and second signals and then modifying the third signal in accordance with the factor relating the FeO in the bath and the slag at equilibrium. The modified third signal is then indicative of the dissolved oxygen in the bath. From the modified third signal another signal is generated which is representative of the carbon concentration in the bath at low carbon values.

The modified third signal is also used to produce a signal representative of the manganese concentration by modifying the third signal in accordance with a signal representative of the initial manganese concentration.

BRIEF DESCRIPTION OF THE DRAWINGS

The present invention will be better understood by reference to the description of the preferred embodiments in connection with the drawings in which like reference characters identify like elements of the figures.

DESCRIPTION OF THE PREFERRED EMBODIMENTS

Figure 1:
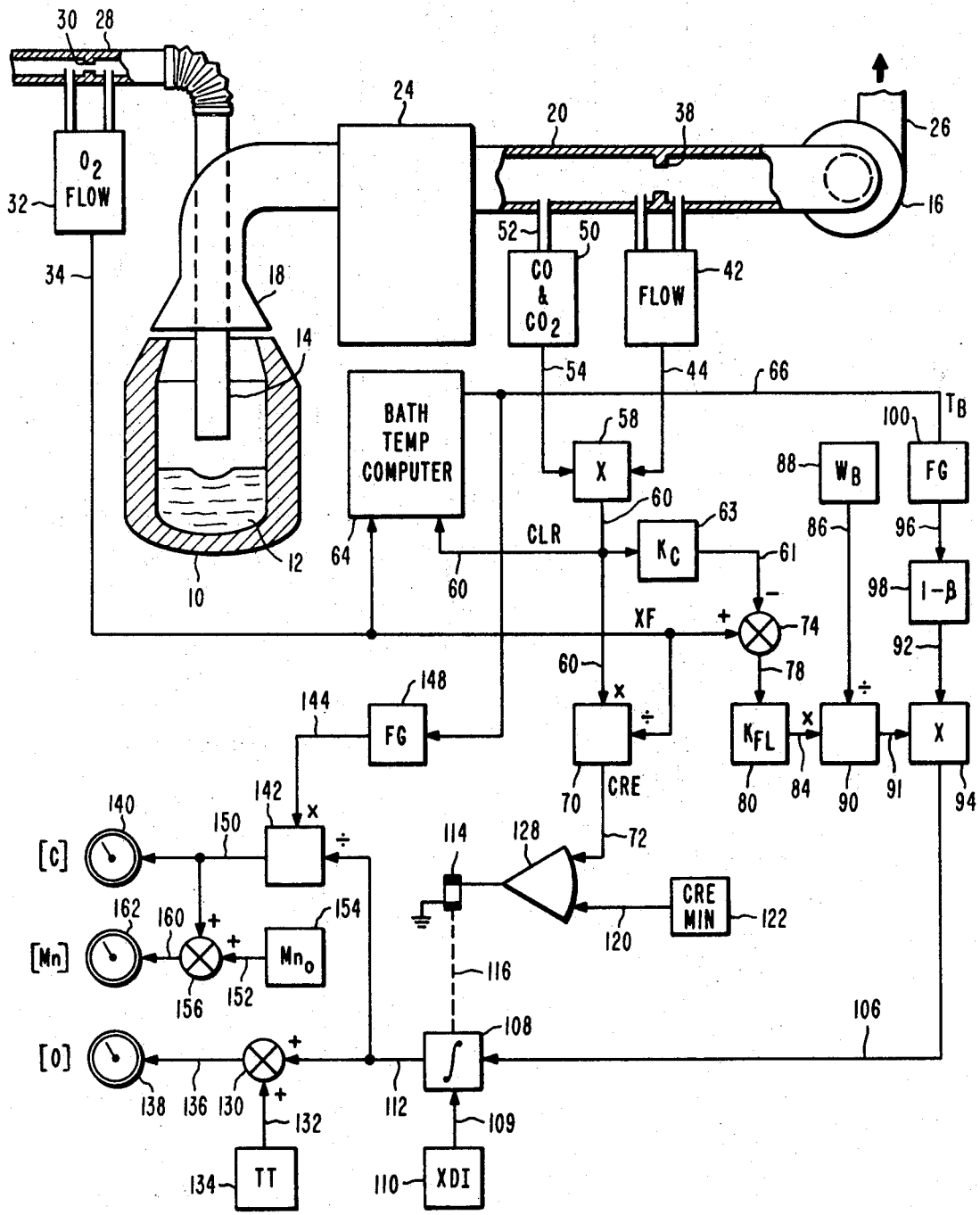
FIG. 1 is a block diagram of one system which can be utilized to provide an indication of the dissolved oxygen and the carbon and manganese concentrations in the bath of an oxygen blown steel refining vessel.

In FIG. 1 the steel refining vessel 10 contains bath 12 which is refined by the blowing of oxygen at high rates of speed through lance 14 so that the oxygen impinges on the surface of the bath 12. The lance 14 is normally movable in a vertical direction so as to be selectively displaced from the surface of the bath 12 in accordance with a predetermined operating procedure or by the operation of an automatic control system such as that disclosed in U.S. patent application Ser. No. 534,617 filed Feb. 14, 1966, by the present inventors.

The oxygen blown from the lance 14 combines with the impurities of the bath to form both a slag cover on the bath and carbonatious gases which are drawn off by the induced draft fan 16 which is connected to a cover 18 over the mouth of the vessel 10 by way of the exhaust duct 20 which is connected through a spark box 24 for cooling the gases and accumulating as much as possible the solid particles carried by the gases in the exhaust system. The fan 16 forces the exhaust gases to stack 26.

The oxygen flow to the lance 14 is provided by way of a supply pipe 28 which contains an orifice plate 30 across which there are supplied the necessary measuring taps for the oxygen flow measuring device 32 which is designed to provide a signal on line 34 representative of the flow of oxygen through the lance into the vessel.

In similar manner the exhaust duct 20 contains an orifice plate 38 across which appear measurement taps for the flow of measurement device 42 which is designed to provide a signal on line 44 representative of the rate of flow of the gases in the exhaust duct 20. The gases in the exhaust duct 20 will comprise mostly carbonatious and the air infiltrated around hood 18. The carbonatious gases may be predominately carbon monoxide if there is very little infiltration of air between the vessel 10 and hood 18 or they may be predominately carbon dioxide if a large amount of air is infiltrated. The concentration of the carbon monoxide and carbon dioxide in the gases is determined and summed by the measuring system 50 which is connected by way of a tap 52 to sample he exhaust gases in duct 20. Measuring system 50 then provides on line 54 a signal representative of the total concentration of CO and $CO_2$ in the exhaust gases.

The flow measuring devices 32 and 42 may, of course, be any one of a number of standard measuring instruments which provides signals representative of the measured values, and the gas analysis system 50 may be any one of a number of well-known systems for measuring the concentration of carbon monoxide and carbon dioxide. Preferably, the gas analysis system represented by the block 50 should be of the type which obtains the sample and provides an analysis with a minimum delay. It has been found that infrared gas analyzers have been adequate for this type of service.

The signals on lines 44 and 54 are multiplied by the multiplier 58 to provide a signal on line 60 representative of the measured carbon loss rate from the bath 12. The carbon loss rate signal on line 60 is utilized along with the oxygen flow signal on line 34 as inputs to bath temperature computer 64 which provides on its output line 66 a signal representative of the bath temperature as inferentially determined from the input signals. The bath temperature computer 64 may be of the type disclosed in U.S. patent application Ser. No. 444,014 filed Mar. 30, 1965 by the present inventors and their co-worker, James R. Gowen, now Pat. No. 3,441,725.

The carbon loss rate signal on line 60 and the oxygen flow rate signal on line 34 are also utilized to obtain a measure of the carbon removal efficiency. They are thus introduced as input signals into the divider 70 so that the carbon removal efficiency determination is then represented by the signal on the output line 72 of divider 70.

The carbon loss rate signal on line 60 and the oxygen flow rate signal on line 34 are likewise compared by the comparator or subtracting device 74 which subtracts from the oxygen flow signal on line 34 a signal derived from line 60, namely the signal which appears on line 61 from the output of multiplier 63. Multiplier 63 multiplies the signal on line 60 by the constant $K_c$, so that the signal on line 61 is representative of the rate at which oxygen combines with the carbon in the bath to form the carbonatious gases CO and $CO_2$ which appear in the exhaust system.

There is then produced as an output from the subtractor 74 on line 78 a signal representative of the total rate of production of FeO in the slag and the bath of vessel 10. This signal is then multiplied by the constant $K_{FL}$, representative of the fume losses, that is, the rate of loss of FeO in the exhaust system of the process. There is thus produced at the output of the multiplier 80 on line 84 a signal representative of the total rate of production of FeO which actually remains in the bath and the slag.

That signal is, of course, representative of the rate of change of the weight of FeO in the bath and the slag.

The signal on line 84 is divided by a signal representing the total bath weight $W_B$ which signal appears on line 86 from a source 88 which is preset to provide a signal representative of the weight of the particular charge being processed. The division is carried out in the divider 90 to provide on the output line 91 a signal representative of the rate of increase of FeO in the bath and the slag in terms of percentage. It is then, of course, necessary to determine what portion of the FeO change occurs in the bath, and for this purpose the signal on line 91 is multiplied by the signal on line 92 by multiplier 94. The signal on line 92 is representative of the fractional portion of the FeO which is expected in the bath as compared with that which is expected in the slag. To obtain the signal on line 92 a signal on line 96 is multiplied by a factor $1-\beta$ by multiplier 98. $\beta$ represents that fraction of the total FeO change which goes into the slag and, therefore, $1-\beta$ represents that portion which goes into the metal bath. The factor $1-\beta$ may be referred to as a partition factor since it is indicative of the partitioning of the FeO between the bath and the slag at equilibrium.

The signal on line 96 may be derived from a constant source, however, it is more advantageously to derive that signal from a source which is varied in accordance with the bath temperature since the partition factor $1-\beta$ normally varies with the bath temperature. The precise nature of this variation is taken into account by the function generator 100. Thus, to obtain the signal on line 96 the signal on line 66 representative of bath temperature is introduced as an input into function generator 100 so as to give an output signal on line 96 which varies with the bath temperature in accordance with an empirically determined relationship between the bath temperature and the partition factor.

The output of multiplier 94 provides a signal on line 106 representative of the rate of increase in concentration of FeO in the metal bath. This signal is then integrated by integrator 108 from an initial value established by the signal on line 109 from the source 110 which is set in accordance with the initial value of dissolved oxygen from which the integration is to be started. There will then be produced on the output line of integrator 108, namely, line 112, a signal representative of the dissolved oxygen in the metal bath. The signal on line 112 will remain at a value corresponding to that on line 109, namely, the initial dissolved oxygen value until relay 114 is energized to operate by way of mechanical coupling 116 to switch integrator 108 into the integrating mode so as to change the output signal on line 112 in accordance with the integral of the signal on line 106. The integration is begun only when the carbon concentration of the bath reaches a particular minimum value. This minimum value is established as a signal on line 120 from the source 122 and is identified as a minimum value for the carbon removal efficiency which as previously mentioned is related to the carbon concentration at low carbon values. Thus, the signal on line 120 is representative of the carbon concentration at which it is desirable to begin utilizing the dissolved oxygen as an indication of the carbon concentration because of the increased accuracies and higher sensitivity of that approach. Thus, relay 114 is energized by relay amplifier 128 whenever the signal on line 72 representing carbon removal efficiency, which is one input to amplifier 128, decreases to the minimum value for the carbon removal efficiency as represented by the signal on line 120.

Since a certain amount of oxygen is taken on by the bath through tapping and teeming, that amount is added by way of the summing device 130. The signal on line 132 is derived from source 134 which is representative of the amount of oxygen added. The signal on line 132 is added to the signal on line 112 by the adding device 130 to provide an output signal on line 136 representative of the dissolved oxygen. The signal on line 136 is introduced into indicator 138 to provide an indication of the dissolved oxygen in the metal bath taking into account that oxygen which is added by tapping and teeming, whereas the signal on line 112 represented the dissolved oxygen in the metal bath absent that additional amount.

Since there is a relationship between the dissolved oxygen in the metal bath and the carbon concentration in the metal bath at the low carbon values such as values below .10% carbon, the signal on line 112 may be utilized to provide an indication on indicator 140 of the carbon concentration in the metal bath. The relationship between the dissolved oxygen in the metal bath and the carbon concentration in the metal bath is, however, a function of the bath temperature and it is, therefore, desirable to introduce bath temperature as a factor in the relationship. In order to accomplish this purpose the divider 142 is utilized to divide the signal appearing on line 144 by the signal on line 112. The signal on line 144 is derived as an output from function generator 148 whose input is from line 66 which is representative of the bath temperature computed by computer 64. Thus, the signal on line 144 will have a predetermined functional relationship with the signal on line 66 as determined by the function generator 148. This particular relationship may be determined empirically.

While the concentration of manganese in the metal bath is related to the dissolved oxygen and can be obtained by derivation from the signal representing dissolved oxygen it is shown in FIG. 1 as being derived from a signal representative of the carbon concentration in the metal bath, namely, the signal appearing on line 150 as an output from the divider 142. The concentration of manganese and the concentration of carbon are known to be roughly proportional in the metal bath. The signal on line 150 is added to the signal on line 152 which can be the output of source 154 adjusted to provide a signal representative of the initial manganese concentration $Mn_0$. Thus, the signal on line 152 and that on line 150 can be added as shown in FIG. 1 by the summing device 156 to produce a signal representative of the manganese concentration. That signal is introduced by way of line 160 to indicator 162 which provides an indication of the manganese concentration.

Figure 2:
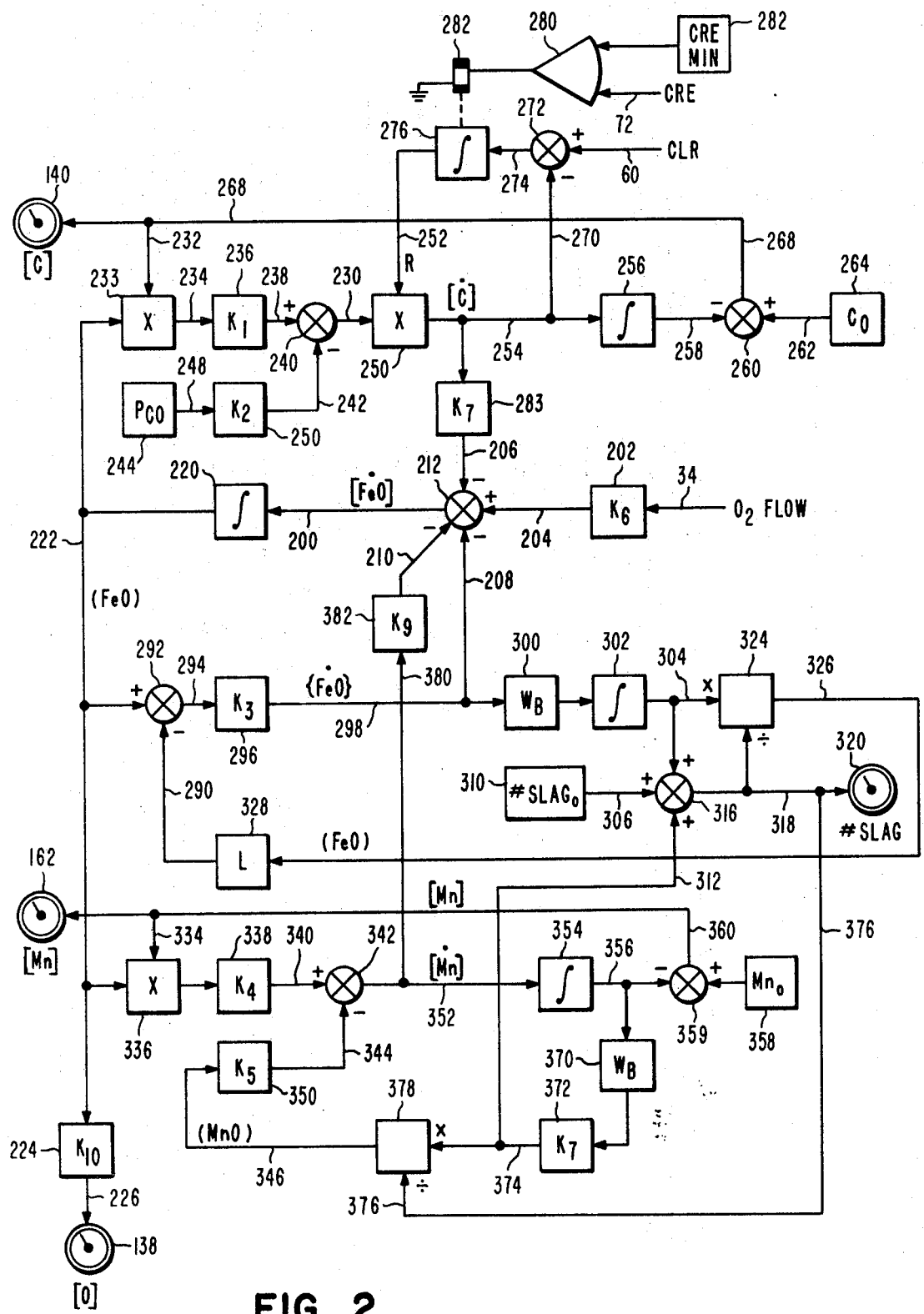
FIG. 2 is a block diagram of another system for obtaining the same indications, namely, the dissolved oxygen, the carbon concentration and the manganese concentration in the bath of an oxygen blown steel refining vessel.

In FIG. 2 there is shown in block diagram form an alternative circuit arrangement for obtaining an indication of the dissolved oxygen, the carbon concentration and the manganese concentration in the bath as was accomplished with the arrangement of FIG. 1. In FIG. 2 there has been omitted the duplication of a number of elements, particularly the showing of the process and the measurement devices for the process variables. For the purposes of making the computations in the manner shown in FIG. 2, there is utilized an input on line 34 representative of the oxygen flow to the lance 14 (FIG. 1). There is also utilized in FIG. 2 a signal on line 60 representative of the carbon loss rate CLR as computed in the manner previously described with regard to FIG. 1. Likewise, line 72 of FIG. 2 carries a signal representative of the carbon removal efficiency CRE which signal could be obtained in the manner set forth in FIG. 1.

The action of the oxygen jet from the lance 14 (FIG. 1) on the FeO content of the bath can be expressed by the following mass balance:

$$[\dot{FeO}] = K_6 X_L - K_7[\dot{C}] - \{\dot{FeO}\} - K_9[\dot{Mn}] \quad (1)$$

where $[\dot{FeO}]$ = rate of increase of FeO in bath in percent/minute
$X_L$ = lance oxygen flow rate in standard cubic feet per minute
$[\dot{C}]$ = rate of carbon removal from bath in percent/minute $\{\dot{FeO}\}$ = rate of FeO transfer to slag from bath in percent of bath weight per minute
$[\dot{Mn}]$ = rate of combination of Mn with oxygen in percent/minute $$K_6 = \frac{2 \times 71.85 \times 100}{379 W_B}$$

$W_B$ = bath weight $$K_7 = \frac{71.85}{12}$$

$$K_9 = \frac{71.85}{52.94}$$

The above Equation 1 expresses the computations carried out in FIG. 2 to obtain the signal on line 200 representative of the rate of increase of FeO in the bath. Thus, the signal on line 34, which is representative of the rate of oxygen flow to the lance, when multiplied by the constant $K_6$ in multiplier 202 produces a signal on line 204 from which the signals on lines 206, 208 and 210 can be subtracted by the comparator or subtractor device 212 to produce the signal on line 200 previously mentioned. The signal on line 204 represents the equivalent percent FeO increase corresponding to the total rate of oxygen flow to the process. It will be evident that in order to obtain on line 200 a signal representing the computed rate of increase in FeO it is necessary to subtract from the signal on line 204 the equivalent rate of change of FeO corresponding with the rate at which the oxygen is combining with other constituents. Thus, the signal on line 206 represents the rate at which the oxygen is being combined with the carbon in the bath to form the CO and $CO_2$ carried off by the exhaust system. Similarly, the signal on line 208 represents the rate at which the oxygen is being utilized to form FeO in the slag, or in other words, the rate at which FeO is being transferred from the bath to the slag to obtain an equilibrium condition between the bath and the slag. The other signal which is subtracted by device 212 is that appearing on line 210 which represents the FeO equivalent to the rate at which oxygen is being combined with the manganese in the bath. Assuming that the above mentioned constituents are the only ones which combine with the oxygen then it can be seen that the FeO equivalent of the rate of oxygen flow remaining is that which combines with the iron and remains in the bath. Thus, there is obtained on line 200 the signal representing the rate in percentage per minute of increase of FeO in the bath.

The signal on line 200 is integrated by integrator 220 which then produces a signal on line 222 indicative of the concentration of FeO in the bath. That signal may be conveniently referred to as the dissolved oxygen signal as it is directly related to the amount of oxygen dissolved in the bath. To obtain a direct indication of the dissolved oxygen in the bath the signal on line 222 is multiplied by a constant $K_{10}$ by multiplier 224 to produce on line 226 a signal which supplies an input to indicator 138 giving a direct indication of the dissolved oxygen in the bath.

The rate of carbon removal from the bath can be expressed by the following equation:

$$[\dot{C}] = K_1[C][FeO] - K_2 P_{co} \quad (2)$$

where $K_1 K_2$ = velocity constants
$[\dot{C}]$ = rate of carbon removed from bath in percent/min.
$[C]$ = concentration of carbon in bath in percent
$[FeO]$ = concentration of FeO in bath in percent
$P_{co}$ = partial pressure of carbon monoxide The above Equation 2 indicates the operations necessary to convert the signal on line 222 to a signal indicative of the rate of carbon removal from the bath which signal appears on line 230. As will be evident from FIG. 2 the signal on line 222 is multiplied by the signal from line 232 which represents the computed carbon concentration in the bath. The resulting product then appears on line 234 and is multiplied by the constant $K_1$ by multiplier 236 to give an output on line 238 which acts as one of the inputs to the comparator or subtracting device 240. The other input for the device 240 appears on line 242 and is obtained by multiplying the predetermined signal from source 244 representative of the partial pressure of carbon monoxide P$co$ and appearing on line 248 by the constant $K_2$ in multiplier 250 to provide the signal on line 242 representative of the second term of the above equation. The signal on line 242 is subtracted from the signal on line 238 as indicated by the polarity markings on the device 240.

Figure 3:
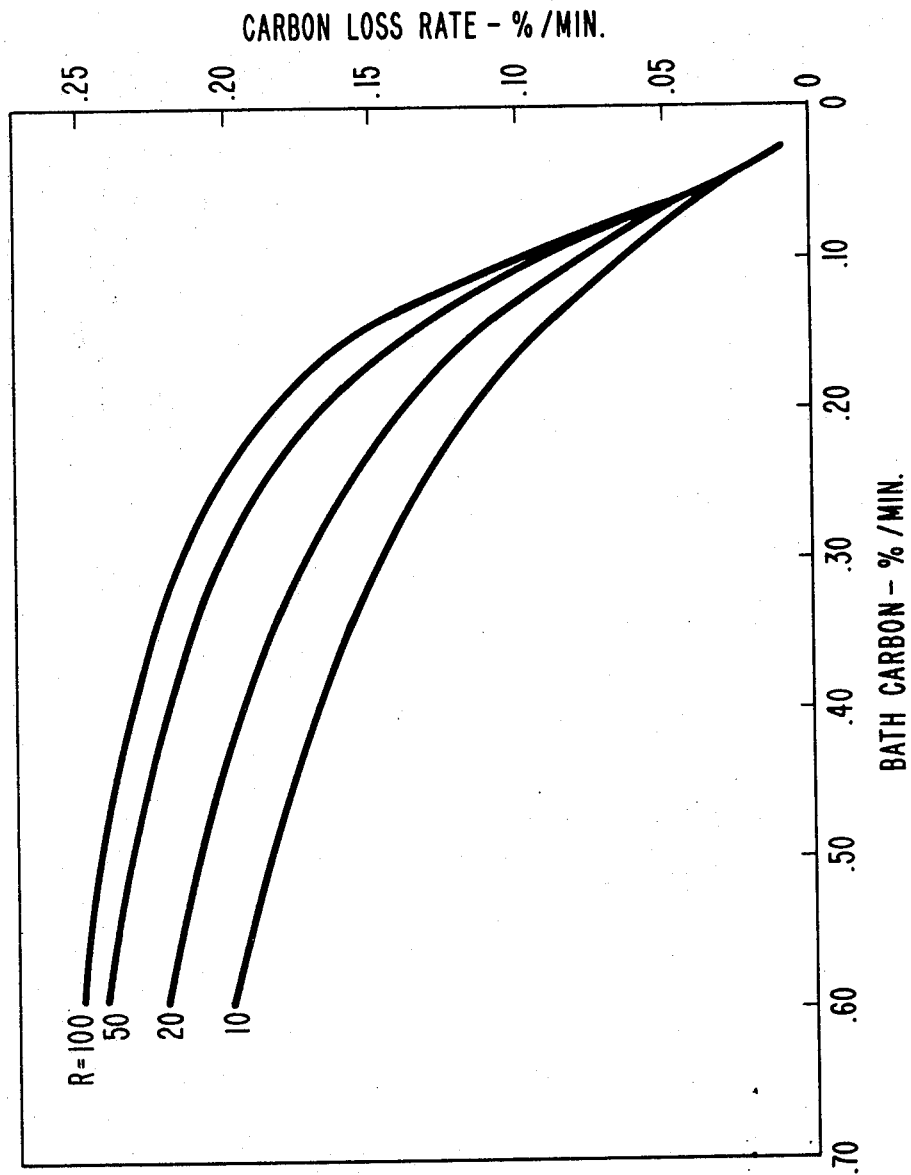
FIG. 3 is a graphic representation of the relationships between carbon loss rate and bath carbon concentration for different reaction rates.

Since there is a family of curves relating carbon loss rate to bath carbon and dissolved oxygen as shown in FIG. 3, the signal on line 230 is modified by multiplier 250 which multiplies by the reaction rate factor R represented by the signal on line 252. The reaction rate R may be considered a fixed constant in which case a preset signal would be applied to line 252; however, it is advantageous to consider R as a variable factor. It is believed that the action of the lance oxygen jet which provides considerable mechanical energy to circulate materials in the metallic bath is responsible for the family of curves relating carbon loss rate and carbon in that the action of the oxygen jet is effective to change the reaction rate of the process. Thus, there is a curve relating loss rate to carbon and dissolved $O_2$ for each reaction rate.

The output of multiplier 250 is a signal on line 254 representing the computed rate of carbon removal which is truly representative of the actual rate of carbon removal since it takes into account the actual reaction rate R of the process.

The signal on line 254 is integrated by integrator 256 to obtain a signal on line 258 indicative of the computed carbon concentration for the period during which the integration by integrator 256 took place. If the quantity represented by the signal on line 258 is subtracted from the initial carbon concentration in the bath, the result will be an indication of the carbon remaining in the bath. This subtraction is carried out by the subtractor 260 which subtracts the signal on line 258 from the signal on line 262. The signal on line 262 is derived from the source 264 which is adjusted to provide a signal representative of the initial carbon concentration Co in the bath. Thus, subtractor 260 provides as an output signal on line 268 a signal indicative of the computed carbon concentration in the bath. This signal is then introduced into multiplier 233 by way of line 232 and it is also introduced as an input into the indicator 140 which provides a direct indication of the carbon concentration in the bath.

In order to establish for the computations above described the particular one of the family of curves of FIG. 3 relating carbon loss rate and carbon concentration which is being followed by the process, or in other words, the particular reaction rate which is effective, the carbon loss rate signal on line 60 is compared with the signal on line 270 which by virtue of its connection with line 254 is representative of the computed carbon removal rate as corrected by the reaction rate multiplier 250. The comparison between the carbon loss rate measured, and thus directly indicative of the process conditions, and the computed rate of carbon removal, is carried out by the comparator 272. As long as any difference exists between the measured and computed values, that difference appears as an output on line 274 and that output is integrated by integrator 276 to provide the signal on line 252 representative of the reaction rate R. Thus, the reaction rate signal R is constantly changed to maintain the signal on line 270 equal to the signal on line 260 and the carbon removal rate as computed and represented by the signal on line 254 is kept at a value corresponding with the actual conditions in the process. However, when the carbon concentration in the bath gets to a particular minimum value, it is desired that the circuit of FIG. 2 be utilized to compute the carbon concentration in the bath and, therefore, there is provided a means such as a switch for stopping the integrating action of integrator 276. For this purpose the carbon removal efficiency signal on line 72 is compared in relay amplifier 280 to the minimum carbon removal efficiency as represented by a signal generated by source 282 representing the minimum value of carbon removal efficiency which can be utilized as an indication of the carbon concentration in the bath. For example, the minimum may represent a carbon concentration in the bath in the order of .10%. Once the integration of the integrator 276 is stopped by the actuation of the relay 282 in response to the output of relay amplifier 280 indicating that the inputs to the amplifier are equal in value or, in other words, that the signal on line 72 has reduced to a value equal to that produced by source 282, the output of the integrator remains constant and the reaction rate factor R is kept constant so that the signal on line 252 will not be changed any further as the process proceeds through the final blow stage.

The signal on line 254 representing the rate of loss of carbon as computed is multiplied by a constant $K_7$ in multiplier 283 to provide on line 206 to FeO equivalent to the oxygen combining with the carbon in the bath.

It is well-known that the concentration of ferrous oxide in the metal can be related to the concentration of ferrous oxide in the slag in accordance with the partition law governing the relative concentrations at equilibrium and expressed as follows:

$$\frac{[FeO]}{(FeO)} = L \quad (3)$$

where

[FeO] = concentration of FeO in the bath in percent
(FeO) = concentration of FeO in the slag in percent While the value of the partition factor L is actually a function of the temperature and was modified in response to a change in bath temperature in the arrangement of FIG. 1, it may be considered constant for the description of this particular circuit. While the partition law is an equilibrium relationship it can be rewritten in the form of a rate equation as follows:

$$\{FėO\} = K_3[FeO] - K_3(FeO) \cdot L \quad (4)$$

where

{FėO} = rate of FeO transfer from bath to slag in percent of bath weight per minute.

In FIG. 2 the circuit arrangement which provides the signal on line 208 is arranged to utilize the relationship of the above Equation 4 as will now be described. The signal on line 222 is compared with the signal on line 290 which represents the computed FeO in the bath corresponding with the computed FeO in the slag under equilibrium conditions. The difference obtained from the output of the comparator 292, which subtracts the signal on line 290 from the signal on line 292, is a signal on line 294 which is then multiplied by the constant $K_3$ by multiplied 296 to provide on line 298 a signal representative of the rate of the FeO transfer to the slag from the bath in percent per minute.

The signal on line 298 is then multiplied by the bath weight $W_B$ by multiplier 300 and the output of multiplier 300 is then integrated by integrator 302 to provide a signal on line 304 representative of the pounds of FeO going to the slag from the bath. The pounds of FeO going to the slag from the bath are then added to the starting weight of the slag represented by a signal on line 306 from the source 310 and to the amount of manganese oxide which will go into the slag as represented by the signal on line 312 as generated by a circuit to be described later. This summation, that is, the summation of signals from lines 304, 306 and 312 is effected by the summing unit 316 to provide a signal on line 318 indicative of the pounds of slag. This signal can be utilized as an input to a display device such as the meter 320 for indicating the total weight of the slag. The signal from line 318 is also divided into the signal on line 304 by the dividing device 324 to provide a signal on line 326 representative of the FeO in the slag in terms of percentage. The signal on line 326 is then multiplied by the partition factor L in multiplier 328 to give the signal on line 290 which as previously mentioned is representative of the FeO in the bath corresponding to the FeO in the slag at equilibrium with the equilibrium condition being refined by the partition factor L.

As shown in FIG. 2, line 298 is connected to line 208, thus the signal on line 298 is introduced as an input into the device 212 as previously described.

In order to determine the concentration of manganese in the bath the below Equation 5 is used as a basis for computation. Thus, the signal on line 222 is multiplied by a signal from line 334 whose magnitude is representative of the computed concentration of manganese in the bath and which will itself be established in accordance with the computations to be later described. The signal on line 334 is multiplied by that on line 222 by multiplier 336 and the output of the multiplier is then multiplied by a constant $K_4$ in multiplier 338. From multiplier 338 the output on line 340 is connected as one input to the comparator or subtractor 342. The other input to subtractor 342 is from line 344 and is derived by multiplying the signal on line 346, representative of the computed concentration of manganese oxide in the bath, by the factor $K_5$ in multiplier 350.

The rate of combination of manganese with oxygen can be expressed as follows:

$$[\text{Mṅ}] = K_4[\text{Mn}][\text{FeO}] - K_5(\text{MnO}) \qquad (5)$$

where

[Mṅ] = rate of manganese removal from bath in percent/min.
[Mn] = concentration of manganese in bath in percent
[FeO] = concentration of FeO in bath in percent
(MnO) = concentration of manganese oxide in slag in percent
$K_4, K_5$ = velocity constants The output of comparator 342 on line 352 is then a signal indicative of the rate of removal of manganese from the bath. That signal is integrated by integrator 354 to obtain the total change in concentration of manganese in the bath as an output signal on line 356. The signal on line 356 is then subtracted from a signal derived from source 358 indicative of the preset initial manganese concentration in the bath. This subtraction is carried out by subtractor 359 to produce an output on line 360 indicative of the concentration of manganese remaining in the bath.

As shown in FIG. 2, line 360 is connected to the indicator 162 which indicates the concentration of manganese in the bath and also line 360 is connected to line 334 which is one of the inputs of multiplier 336, as previously mentioned.

In order to obtain the signal on line 346 the signal on line 356, which is representative of the total decrease in the concentration of manganese in the bath, is multiplied by the bath weight. This is accomplished by multiplier 370. The output of the multiplier 370 is then multiplied by the constant $K_7$ by multiplier 372 to produce a signal on line 374 representative of the pounds of manganese going to the slag.

The signal on line 374 is then divided by the weight of the slag by dividing the signal 374 by the signal appearing on line 376 with divider 378 so as to produce a signal on line 346 indicative of the concentration of manganese oxide in the slag. The signal on line 376 is obtained from line 318 and, therefore, has a magnitude in accordance with the computed weight of the slag.

The signal on line 352, indicative of the rate of change of the manganese concentration in the bath, is also connected by way of line 380 to multiplier 382 where it is multiplied by the constant $K_9$ in order to provide an output signal from the multiplier 382 on line 310 representative of the FeO equivalent of the oxygen consumed by combination with manganese from the bath to form manganese oxide in the slag.

The signal on line 374 is connected by way of line 312 to provide one of the inputs to the summing device 316.

What is claimed is:
1. The method for determining the dissolved oxygen in the bath of an oxygen blown steel refining furnace comprising the steps of
generating a first signal representative of the measured flow rate of oxygen supplied to the furnace,
generating a second signal representative of the rate of oxygen consumption resulting from combination with the carbon in the bath,
generating a third signal in response to the integrated difference between said first and second signals, and
modifying said third signal in accordance with a factor which is a function of the expected relative concentrations of FeO in the bath and the slag at equilibrium so that said third signal is representative of the dissolved oxygen in the bath.

2. The method of claim 1 in which the step of modifying said third signal is in response to a fourth signal representative of the rate at which FeO is transferring from the metal to the slag, said fourth signal being a function of said factor.

3. The method of claim 1 in which the step of modifying said third signal is in response to a signal which is a function of said factor indicative of that part of the total FeO which appears in the bath.

4. The method of claim 1 in which the step of modifying said third signal is in response to a signal which is a function of the temperature of the bath and said factor.

5. The method of claim 1 which includes the step of generating a signal representative of the carbon concentration in the bath at low carbon values in response to said dissolved oxygen signal.

6. The method of claim 5 in which the carbon concentration signal is generated in response to both said dissolved oxygen signal and to a signal which is a function of the temperature of the bath in said furnace.

7. The method of claim 5 which includes the step of generating a signal representative of the concentration of manganese in the bath in response to the dissolved oxygen signal and a signal representative of the initial manganese concentration.

8. A system for determining the dissolved oxygen in the bath of an oxygen blown steel refining furnace comprising
means for determining the rate of loss of oxygen from the bath by combination with carbon in the bath,
means for measuring the rate of flow of oxygen to said furnace,
means for subtracting the rate of oxygen loss due to the combination with carbon from the measured rate of flow of oxygen to the furnace to obtain a total value indicative of the rate of change of oxygen in the slag and the bath,
means for determining the part of said total value derived from said last named means which is associated with the bath, and
means for integrating said part of the total value to determine the amount of dissolved oxygen in said bath.

9. A system as set forth in claim 8 which includes means responsive to the output of the integrating means for indicating the carbon content of the bath.

10. A system as set forth in claim 9 in which the means responsive to the output of the integrating means includes means for multiplying that output by a function of the bath temperature.

11. A system as set forth in claim 9 which includes means responsive to the carbon content determining means and a signal representative of the initial manganese concentration for determining the existing manganese concentration in the bath.

12. A system for determining the concentration of certain constituents in the bath of an oxygen blown steel refining furnace comprising
means for measuring the concentration of carbon containing gases in the exhaust system of said furnace,
means for measuring the rate of flow of gases in the exhaust system,
means for producing a signal indicative of the carbon loss rate from said furnace in accordance with the product of the concentration of the carbon containing gases in the exhaust system and the rate of flow of gases in the exhaust system,
means for producing a signal indicative of the rate of flow of oxygen to said furnace,
means responsive to the difference between the said oxygen flow signal and the carbon loss rate signal and operable to produce a signal indicative of the oxygen supplied to the furnace and not consumed in forming the said carbon containing gases,
means for decreasing the value of the last mentioned signal in accordance with the magnitude of the loss of oxygen in the dissipation of non-carbon bearing gases and oxygen containing solids through the exhaust system of the furnace,
means for multiplying the decreased value of the last mentioned signal by a factor representative of the portion of the dissolved oxygen normally found in the bath as compared with the total of that found in the bath and the slag combined,
means for integrating the output of said multiplying means starting with a pre-set initial value to obtain a signal indicative of the dissolved oxygen in the bath, said integration being initiated when the carbon loss rate and oxygen flow are of values indicating the reduction of carbon concentration in the bath below a certain pre-set low carbon value,
means for modifying the dissolved oxygen signal to add to it a value indicative of the amount of oxygen picked up normally during tapping and teeming,
means for modifying the dissolved oxygen signal in accordance with the bath temperature to obtain a signal indicative of the carbon concentration in the bath, and
means responsive to said carbon concentration signal and to a signal representing the initial manganese concentration to produce a signal indicative of the manganese concentration remaining in the bath.

13. A system for determining the concentration of certain constituents in the bath of an oxygen blown steel refining furnace comprising
means for measuring the concentration of carbon containing gases in the exhaust system of said furnace,
means for measuring the rate of flow of gases in the exhaust system,
means for producing in response to the product of said concentration and said rate of flow a signal representative of the measured carbon loss rate from said furnace,
means for producing a signal representing the rate of flow of the oxygen to said furnace,
means for producing a signal indicative of the carbon removal efficiency by dividing the carbon loss rate signal by the oxygen flow signal, said carbon removal efficiency signal being related to the carbon concentration in said bath at low carbon concentrations,
means for subtracting from the oxygen flow signal a signal representing the oxygen loss rate from the bath determined from a computed carbon loss rate signal, a signal representing the oxygen loss rate from the bath determined from a signal representing the computed rate of change of the FeO concentration in the bath to FeO concentration in the slag, and a signal representing the oxygen loss rate from the bath determined from a signal representing the computed rate of loss of manganese from the bath,
means for integrating the result of said subtraction to produce a signal representative of the concentration of FeO in the bath and hence the dissolved oxygen in the bath,
means for multiplying the dissolved oxygen signal by a signal representing the computed carbon concentration in the bath, said computed carbon concentration signal being produced by the integration from an initial value of the said computed carbon loss rate signal,
means for multiplying the output of said multiplying means by a constant,
means for subtracting from the output of said last named multiplying means a quantity representing the product of a constant and the partial pressure of the carbon monoxide from the bath,
means for multiplying the output of said last named subtracting means by a reaction rate factor to obtain said computed carbon loss rate signal,
means for continuously changing said reaction rate factor so as to maintain equality between the computed carbon loss rate signal and the measured carbon loss rate signal so long as the carbon removal efficiency signal is above a certain value preset in accordance with the carbon concentration value of the bath below which the computed carbon concentration signal is useful,
means for integrating the computed carbon loss rate signal,
means for subtracting the signal resulting from said integration from a signal representing the initial carbon concentration in the bath to obtain said signal representing the computed carbon concentration,
means for subtracting from the dissolved oxygen signal a signal representing the computed FeO in the bath, said last named signal being derived from the product of a signal representative of the computed FeO in the slag and a partition factor,
means for multiplying the difference resulting from the last named signal produced as an output from said last named subtracting means by a constant to thereby produce said signal representing the rate of change of the FeO concentration in the bath to the FeO concentration in the slag.
means for multiplying said last named signal by the bath weight and integrating the result of said multiplication to obtain a signal representative of the computed change in the weight of the FeO in the slag,
means for adding said signal representing the computed change in the weight of the FeO in the slag to a signal representing the initial weight of the slag and a signal representing the weight of the MnO added to thereby obtain a signal representative of the total slag weight,
means for dividing the signal representing the computed change in the weight of the FeO in the slag by the signal representing the total slag weight to produce said signal representative of the computed FeO in the slag, and
means responsive to the signal representative of the computed carbon concentration for providing an indication of that concentration.

14. A system as set forth in claim 13 which includes means for multiplying the dissolved oxygen signal by a signal representing the computed manganese concentration in the bath, said computed manganese concentration signal being produced by the integration from an initial value of the signal representing the computed rate of change of manganese, means for multiplying the output of said last named multiplying means by a constant, means for subtracting from the output of said last named multiplying means a signal representing the product of a constant and the computed concentration of manganese oxide in the slag to produce said signal representing the computed rate of change of concentration of manganese in the bath, means for integrating said computed rate of change of manganese, means for subtracting the output of said last named integrating means from a signal representing the initial concentration of manganese, means for multiplying the output of said integration means by the bath weight and multiplying the resulting product by a constant factor to produce a signal representing the weight of manganese oxide in the slag, means for dividing said last named signal by said signal representing the total slag weight to thereby produce a signal representing said computed concentration of manganese oxide in the slag, and means responsive to the signal representative of the computed manganese concentration for providing an indication of that concentration.

References Cited

UNITED STATES PATENTS

| | | | |
|---|---|---|---|
| 3,359,784 | 12/1967 | Jorre | 73—23 |
| 3,329,495 | 7/1967 | Takayoshi | 75—60 |
| 3,432,288 | 3/1969 | Ardito | 75—60 |
| 3,372,023 | 3/1968 | Krainer | 75—60 |
| 3,475,599 | 10/1969 | Schwartzenberg | 235—151.35 |

OTHER REFERENCES

A New Look at the Nature of the Open-Hearth Process, B. Larsen, 1956, pp. 3–43.

Open Hearth Furnace Design, Lychagin, 1962, 148–153, 156.

Predicting Effects of Oxygen . . . Additions on Blast Furnace Operations With Electronic Computers, A Hodge, Iron & Steel Engineer, August 1960, pp. 170–174.

Biswas et al.: Physical Chem. of Metallurgical Process, 1962, pp. 312–314.

U.S.S., Making, Shaping, Treating of Steel, 1957, pp. 23, 24.

RICHARD C. QUEISSER, Primary Examiner

J. WHALEN, Assistant Examiner

U.S. Cl. X.R.

23—232; 75—60

PO-1050
(5/69)

UNITED STATES PATENT OFFICE
CERTIFICATE OF CORRECTION

Patent No. 3,566,671    Dated March 2, 1971

Inventor(s) Bernard Blum & John W. Schwartzenberg

It is certified that error appears in the above-identified patent and that said Letters Patent are hereby corrected as shown below:

Column 3, line 22, "he" should read --the--

Column 6, line 14, "$K_9=\frac{71.85}{52.94}$" should read --$K_9=\frac{71.85}{54.94}$--

Column 6, line 67, "[C]" should read --[Ċ]--

Column 8, line 61, "plied" should read --plier--

Signed and sealed this 14th day of March 1972.

(SEAL)
Attest:

EDWARD M. FLETCHER, JR.
Attesting Officer

ROBERT GOTTSCHALK
Commissioner of Patents